Aug. 29, 1939. W. T. DUNN ET AL 2,170,856
POWER TRANSMISSION
Filed Nov. 26, 1937    5 Sheets-Sheet 1
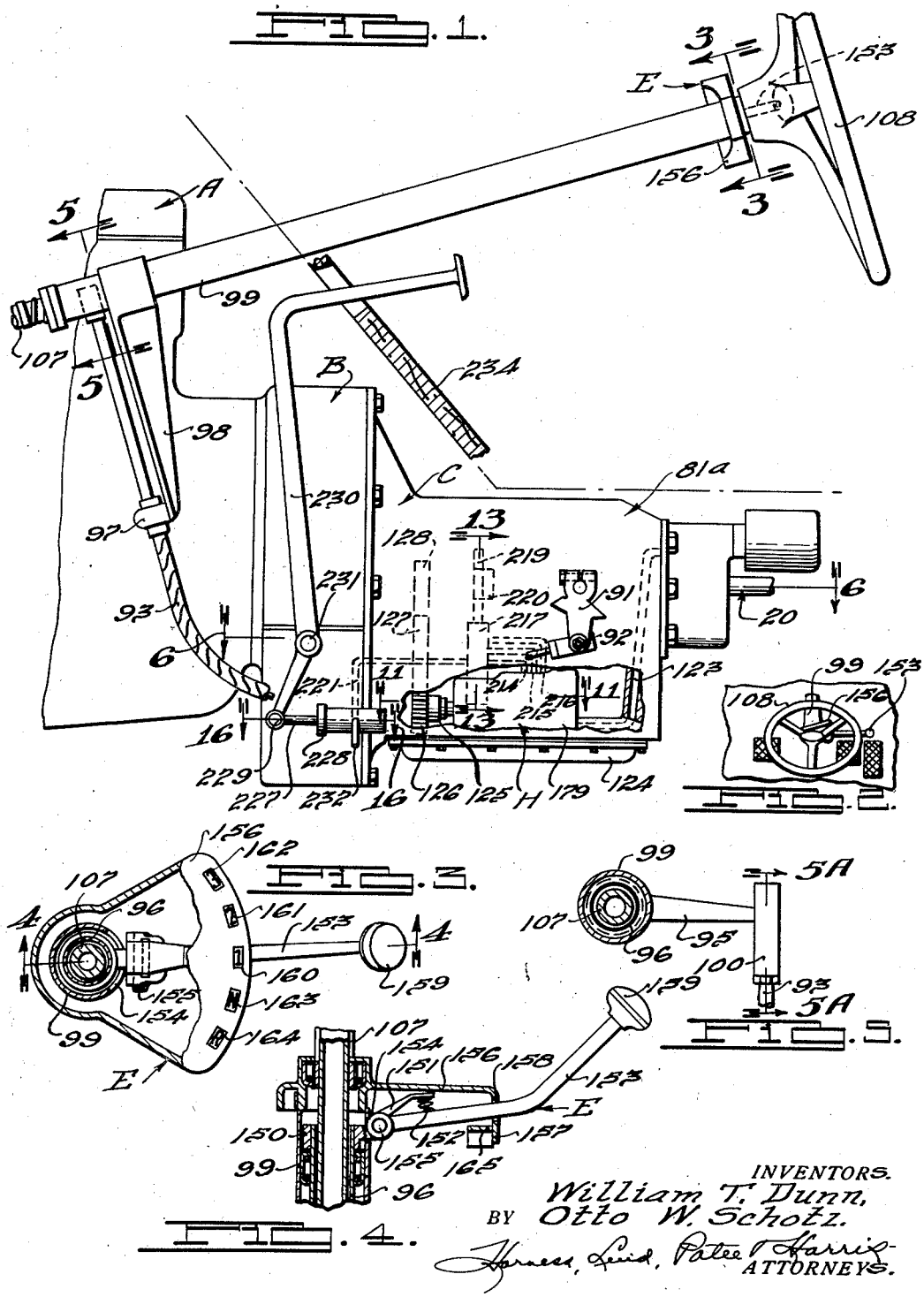
INVENTORS.
William T. Dunn,
BY Otto W. Schotz.
Harness, Dickey, Pierce & Harris
ATTORNEYS.

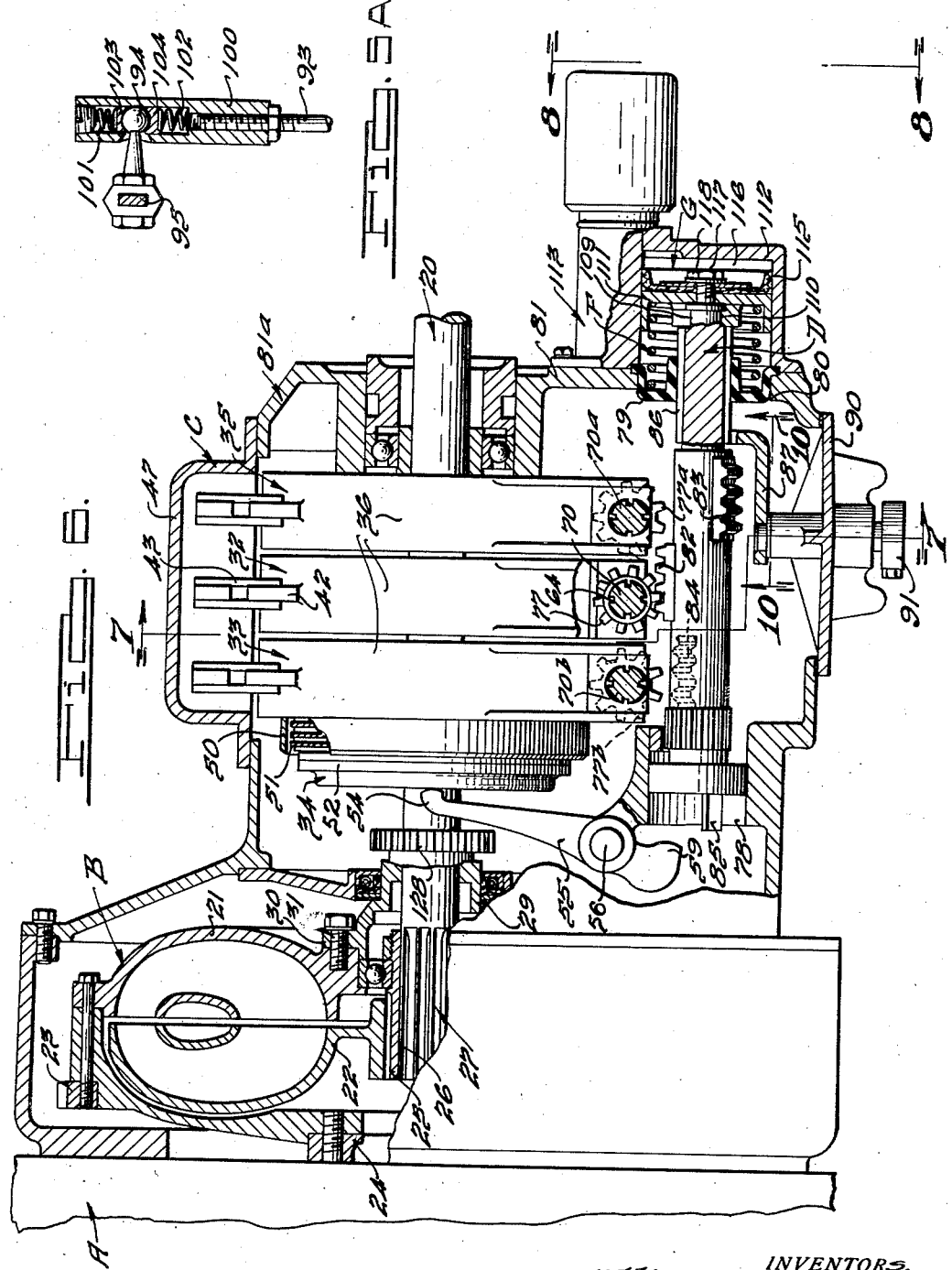

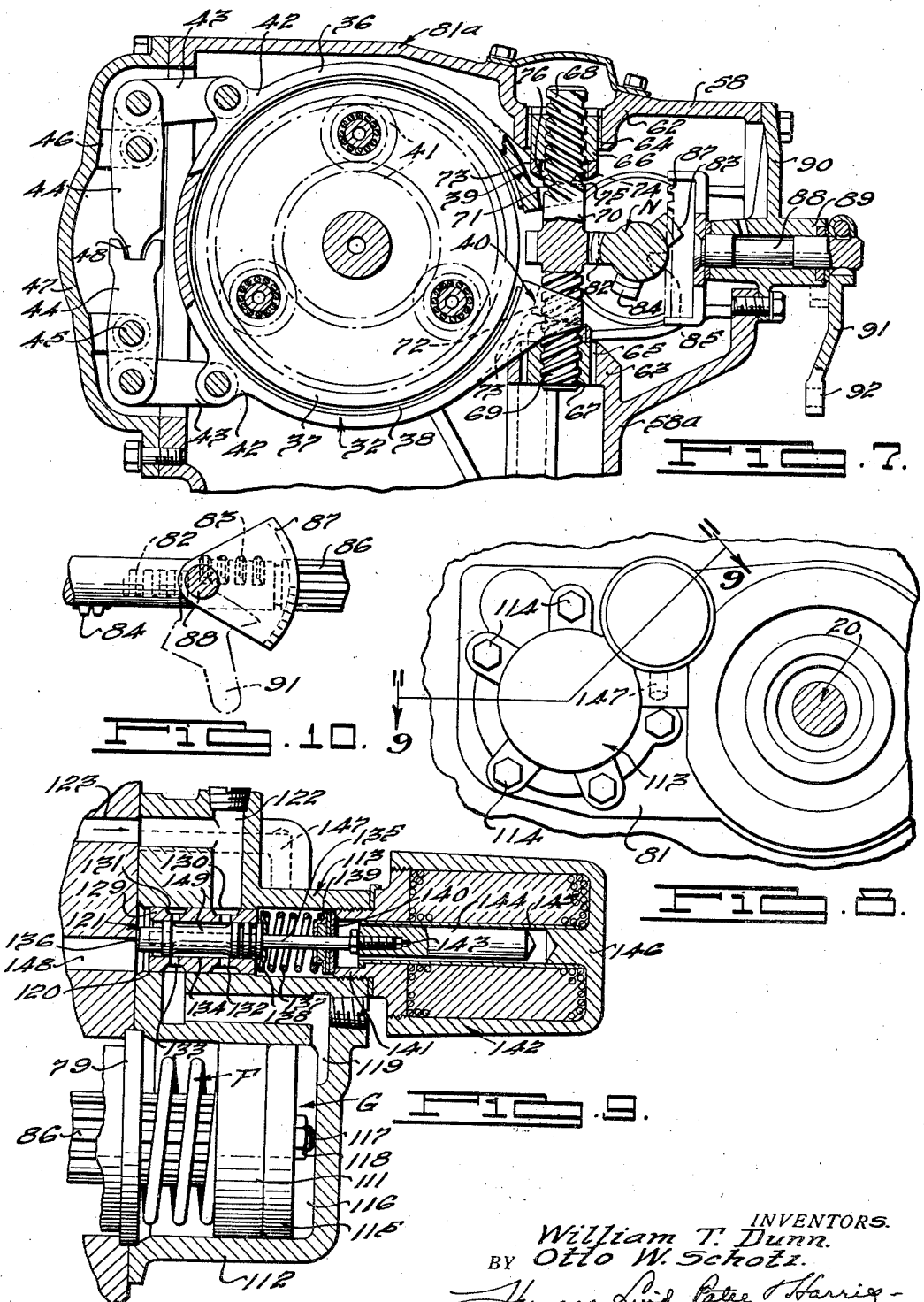

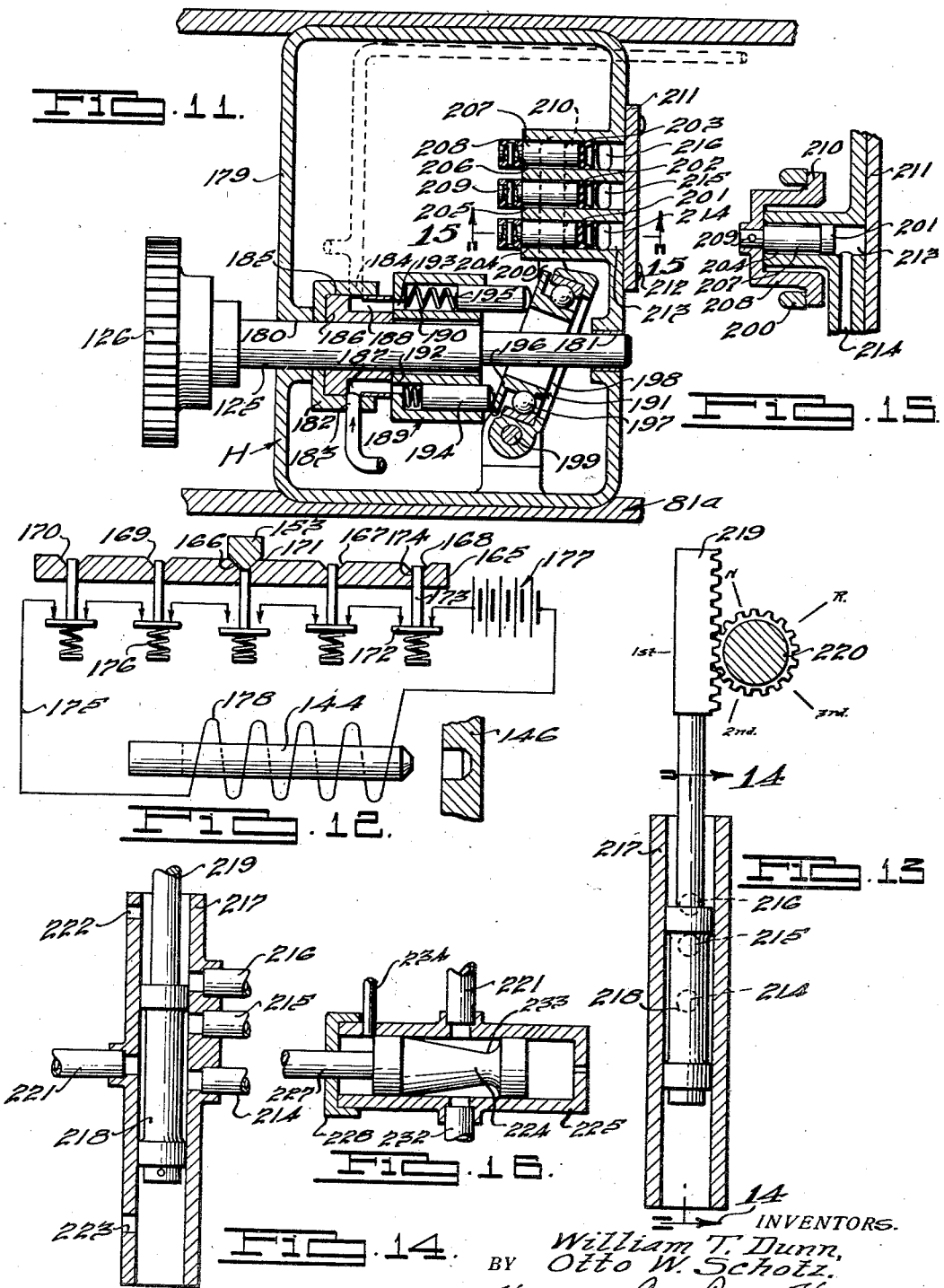

Aug. 29, 1939.    W. T. DUNN ET AL    2,170,856
POWER TRANSMISSION
Filed Nov. 26, 1937    5 Sheets-Sheet 5
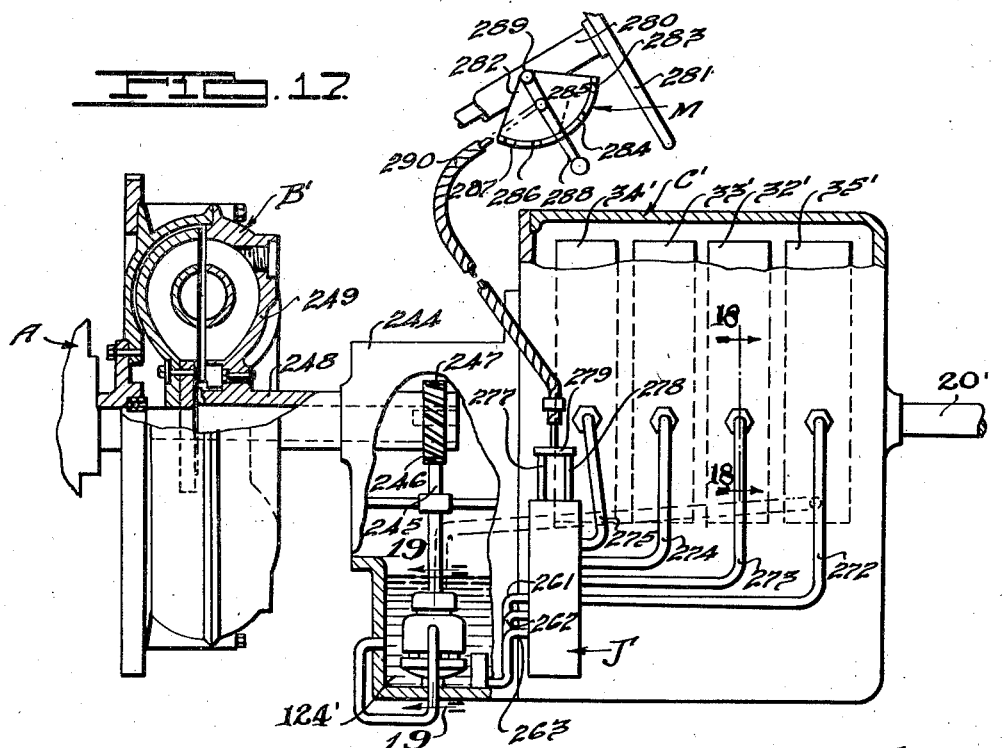
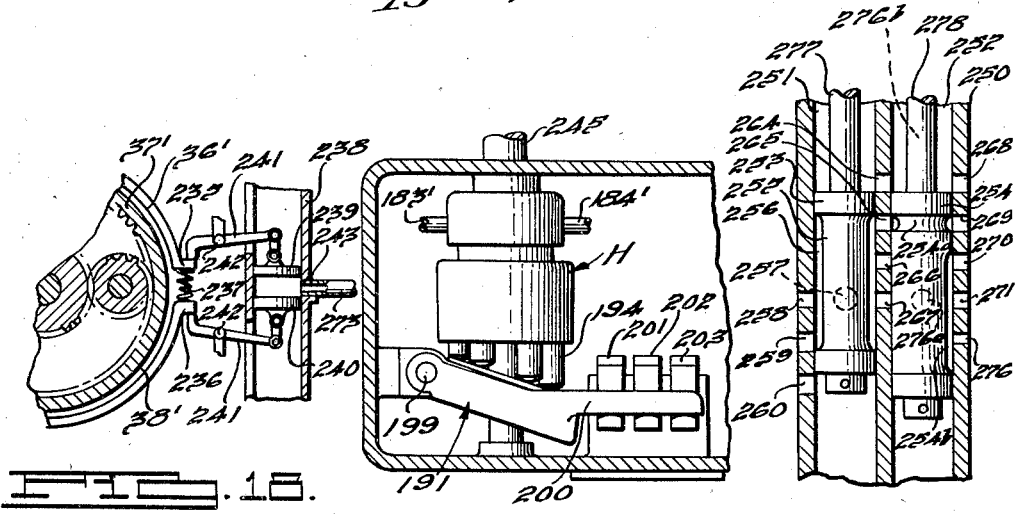
INVENTORS.
William T. Dunn.
BY Otto W. Schotz.
ATTORNEYS.

Patented Aug. 29, 1939

2,170,856

UNITED STATES PATENT OFFICE 2,170,856

POWER TRANSMISSION

William T. Dunn and Otto W. Schotz, Detroit, Mich., assignors to Chrysler Corporation, Highland Park, Mich., a corporation of Delaware Application November 26, 1937, Serial No. 176,607

19 Claims. (Cl. 74—262)

Our invention relates to power transmission mechanism and refers more particularly to improvements in power transmission systems especially adapted for use in connection with motor vehicles, although not necessarily limited thereto.

The invention, in certain more limited aspects, provides improvements in the drive and control for power transmission systems having epicyclic or planetary gear trains. It is customary with such planetary transmissions to arrange the gearing to provide for the desired number of speed ratios between the engine and the vehicle driving ground wheels, and such gearing is customarily selected and controlled to obtain the desired driving speed ratio by actuation of any one of a group of transmission controlling devices usually consisting of reaction brake bands associated with and controlling the rotation of corresponding drums or similar elements of the various gear trains.

One object of our invention is to provide a novel and inexpensive means for effecting, in response to the selection of a speed ratio, the desired degree of engagement of the selected speed ratio controlling device of the transmission.

Another object of our invention, in certain more limited aspects, resides in the provision of a pump pressure regulating means which effects the desired fluid pressure for actuating the pressure operating means to properly control the brake bands and clutches of the planetary gear trains or other corresponding types of transmissions in response to the selection of a speed ratio controlling device of the transmission. In the broader aspects of our invention, the fluid pressure is preferably provided by a suitable liquid medium such as oil, but the fluid pressure medium may be air under pressure greater or less than atmospheric pressure.

A further object of our invention is to provide a simple and efficient means for regulating the well-known swash plate pump—of such type as is described and claimed in the copending application of Augustin J. Syrovy, Serial No. 29,788, filed July 5, 1935—in order to provide, in response to the selection of a transmission speed ratio, the proper maximum fluid pressure to effect the degree of engagement of the selected transmission speed ratio controlling device necessary to control the torque transmitted by the selected speed ratio.

A still further object of our invention resides in the provision of multiple level-off pistons to regulate the inclination of the swash plate of the well-known swash-plate pump, in response to the selection of a transmission speed ratio, to effect the fluid pressure necessary for the operation of the selected speed ratio controlling device to control the torque transmitted by the selected speed ratio.

Another object of our invention is to provide a pressure regulating means to regulate the swash-plate pump in response to the selection of a transmission speed ratio, to effect the fluid pressure necessary for the operation of the selected speed ratio controlling device to control the torque transmitted by the selected speed ratio, and to simultaneously deliver said necessary fluid pressure to the operating means for said selected speed ratio controlling device.

Further objects and advantages of our invention will be apparent from the following detailed descriptions of several illustrative embodiments of the principles of our invention, reference being had to the accompanying drawings in which:

Fig. 1 is a side elevational view, somewhat diagrammatic in form, illustrating our power transmission mechanism as a whole.

Fig. 2 is a detail elevational view showing the manually controlled selector element and the well known foot-operated clutch, brake and accelerator pedals of a motor vehicle.

Fig. 3 is a sectional view of the manually controlled selecting mechanism taken as indicated by the line 3—3 of Fig. 1.

Fig. 4 is a sectional view along the line 4—4 of Fig. 3.

Fig. 5 is an enlarged sectional view taken approximately as indicated by the line 5—5 of Fig. 1.

Fig. 5A is an enlarged detail sectional view taken along the line 5A—5A of Fig. 5.

Fig. 6 is an enlarged sectional view taken along the line 6—6 of Fig. 1 through the transmission and fluid clutch.

Fig. 7 is a vertical sectional view through the transmission, illustrating one of the speed ratio controlling devices and parts associated therewith, the section being taken as indicated by the line 7—7 of Fig. 6.

Fig. 8 is a vertical elevational view illustrating the housing mechanism for the fluid pressure operator and associated control valve, the view being taken approximately as indicated by the line 8—8 of Fig. 6.

Fig. 9 is a detail sectional view taken along the line 9—9 of Fig. 8.

Fig. 10 is a detail vertical sectional view taken approximately as indicated by the line 10—10 of Fig. 6.

Fig. 11 is a detail sectional view of the transmission pump and a portion of our pressure regulating means, the section being taken as indicated by the line 11—11 of Fig. 1.

Fig. 12 is a diagrammatic view illustrating the electrical system of control between the manually operated selector element and the fluid pressure control valve mechanism.

Fig. 13 is an enlarged sectional view taken approximately as indicated by the line 13—13 of Fig. 1.

Fig. 14 is a detail sectional view taken along the line 14—14 of Fig. 13.

Fig. 15 is a detail sectional view taken approximately as indicated by the line 15—15 of Fig. 11.

Fig. 16 is an enlarged horizontal section taken along the line 16—16 of Fig. 1.

Fig. 17 is a side elevational view corresponding to Fig. 1 but illustrating another embodiment of our pressure regulating means.

Fig. 18 is a fragmentary vertical sectional view somewhat diagrammatic and illustrating one of the planetary transmissions speed ratio brake controlling devices, the section being taken along the line 18—18 of Fig. 17.

Fig. 19 is an enlarged vertical sectional view taken approximately as indicated by the line 19—19 of Fig. 17.

Fig. 20 is an enlarged view of the valve mechanism shown in Fig. 17.

Referring now to the drawings—we have illustrated our invention in connection with a motor vehicle drive, this drive including a prime mover or engine A, a portion of which is shown in Fig. 1, a main clutch B driven from the engine, and a change speed transmission or gear box C driven from the clutch B. The drive passes from the transmission through the power take-off shaft 20, which, as usual, may extend rearwardly of the vehicle to drive the usual ground wheels (not shown).

The clutch B may be of any suitable construction for controlling the drive between engine A and transmission C, this clutch being illustrated in Fig. 6 in the form of a fluid coupling type having the usual driving and driven cooperating vane members 21 and 22 respectively. The driving vane member 21 is carried by the engine flywheel 23, the latter being connected as usual with the rear end of the engine crankshaft 24. The driven vane member 22 is splined to a hub 25 which in turn is splined at 26 on the forward end of the driven shaft 27. This driven shaft extends rearwardly to drive the power take-off shaft 20 through the intermediary of the various gear trains of transmission C.

Where the power means for operating the transmission is afforded by a fluid such as oil under pressure, the pump for placing the oil under pressure is preferably operated from the engine to maintain the fluid pressure even when the pump is idling. It is therefore preferred to provide a pump drive from the driving clutch member 21 rather than the driven clutch member 22 inasmuch as the latter may be stationary under certain conditions of vehicle operation such as when the vehicle is standing still with the engine idling.

This pump drive may be provided by reason of a driving sleeve or hollow shaft 29 mounted on the shaft 27 but rotatable independently thereof. The sleeve 29 has a hub or flange 30 connected at 31 with the driving vane member 21 of the clutch B so that even when the driven vane member 22 is not being operated from the driving vane member 21, the sleeve 29 will be rotatably driven from the engine crankshaft 24 and flywheel 23. The pump drive from sleeve 29 will be more apparent hereinafter.

We have illustrated the fluid type of clutch B since a clutch of this character has a number of advantages in connection with a transmission of the planetary gear type C and in further connection with our arrangement of vehicle driving controls which will be presently described more in detail. Among the advantages of the fluid type of clutch are the provision of a smooth drive for the vehicle through the planetary transmission, relatively high power driving efficiency, automatic release of the drive between the engine and transmission when the engine is idling, and with the transmission manipulated to establish one of its driving gear ratio settings, and other well known favorable characteristics. We desire to point out, however that other types of clutches may be employed to control the drive between engine A and transmission C within the broader aspects of our invention. For example, the well known type of friction clutch may be employed and manually operated or automatically operated by the well known commercial type of vacuum clutch releasing mechanism as will be readily understood.

We have illustrated the change speed transmission C as the epicyclic or planetary type, this general form of transmission being well known in the art and, as usual, includes a plurality of transmission speed ratio controlling clutches or brakes 32, 33, 34 and 35, these braking controlling devices being respectively adapted to actuate the transmission in its first speed ratio or low gear, second speed ratio or intermediate gear, third speed ratio or direct drive, and reverse drive. Other speeds may be provided as desired.

The typical brake device 32 illustrated in Fig. 7 consists of an outer band 36 which substantially surrounds the rotary element or drum 37, the band being provided with friction braking material 38 carried by the band and adapted for frictional engagement with the drum 37. The band 36 has its ends formed with laterally projecting actuating flanges 39 and 40 positioned adjacent each other, means being provided to move the band ends toward each other to contract the band 36 for causing the friction material 38 to brake rotary drum 37, the band having sufficient inherent resilience to expand away from contact with the drum when the actuating means is relieved at the flanged ends 39 and 40. In Fig. 7 the low speed ratio braking devices 32 is illustrated in its inoperative position whereby the drum 37 is free to rotate through operation of the planetary gear set 41 somewhat diagrammatically illustrated in association with the drum 37. When the braking device 32 is actuated by contracting the band 36, the drum 37 is held against rotation, the driven shaft 20 in such instance being operated through the planetary gearing 41 to provide the low speed drive for the motor vehicle.

In order to anchor the band 36 and to substantially equalize the braking forces applied to drum 37 around the periphery thereof and thereby substantially avoid a tendency toward lateral loading of the drum and planetary gearing transverse to the axis of the drum, we have provided the band with a circumferentially spaced pair of anchoring flanges 42. These flanges are connected through links 43 with the levers 44 pivotally mounted at 45 with the supporting bracket 46 of the transmission side cover casing 47, the levers 44 being interlocked at 48 so that movement of one of the flanges 42 will be transmitted through the pivotal levers 44 and the links 43 to the other portion of the band associated with the anchoring device. The links 43 are thus pivotally connected at their opposite ends respectively with the anchors 42 and levers 44.

The third speed clutching controlling device 34 is arranged for a direct drive through the transmission and differs somewhat from the braking devices 23, 33 and 35 in that the controlling device 34 has its rotary controlling element 50 adapted for clutching action in a well known manner by frictional engagement through the discs 51 by an axially movable clutching member 52. The latter clutching member is thus engaged by the yoked end 54 of an actuating lever 55 pivotally mounted by a pin 56 suitably supported in the transmission casing. On the opposite side of pivot 56 the lever 55 is provided with a step actuating portion 59, the purpose of which will presently be more apparent.

The transmission casing portions 58 and 58ª are respectively provided with the vertically spaced inwardly extending supporting brackets 62 and 63, respectively, these brackets being formed with coaxial splined openings 64 and 65, respectively. Splined within these openings are the nuts 66 and 67 which are axially and oppositely threaded to receive the correspondingly threaded ends 68 and 69 of an operating oscillatory shaft or screw 70.

The shaft 70 extends through openings 71 and 72, respectively, formed to open laterally in the aforesaid band ends 39 and 40, these openings having considerable clearance with shaft 70 so as not to bind on the shaft when the band is contracted and expanded. In order to transmit the thrust of the nuts 66 and 67 to the flanges 39 and 40 so as to relieve distorting loads on the shaft 70 and parts associated therewith, each nut operates a sleeve 73 having a curved face 74 engaging a curved face 75 of band end 39 or 40. The engaged curved faces 74 and 75 provide a rocking freedom of action, each sleeve 73 having a clearance indicated at 76 with the shaft 70.

The operating shaft 70 of the low speed braking device 32 has its portion thereof intermediate the band ends 39 and 40 formed with a gear 77, the means for oscillating shaft 70 through the gear 77 being hereinafter more particularly described.

In the operation of the low speed controlling device 32 as thus far described, it will be apparent that when the shaft 70 is given a rotary movement, such movement operates through the oppositely threaded ends 68 and 69 of the shaft 70 to cause the nuts 66 and 67 to move inwardly toward each other in their splined openings 64 and 65 respectively, this movement acting through the sleeves 73 to contract the band ends 39 and 40 whereby the low speed drum 37 has its rotation checked for establishing the low speed drive through the transmission. When the shaft 70 is rotated in the opposite direction, the nuts 66 and 67 are moved away from each other and the band 36 is expanded to permit the drum 37 to again rotate and thereby relieve the drive through the transmission controlling device 32.

In order to avoid repetition we have not illustrated all of the details of the brake operated means associated with the controlling devices 33 and 35, it being understood that such operating means are similar to that described in connection with the controlling device 32. For convenience of reference the operating shaft or screw 70 for the reverse speed braking device is designated as 70ª and the corresponding shaft for the second speed braking device 33 is designated as 70ᵇ. The gears associated with these screw shafts are respectively designated as 77ª and 77ᵇ. As will be more apparent, presently, the gears 77, 77ª and 77ᵇ and lever end 59 are adapted to be selectively operated in order to selectively control the engagement and release of the respective speed ratio controlling devices 32, 35, 33 and 34.

The transmission casing is adapted to support in a forward opening 78 the reciprocating and oscillating rack or actuating shaft D. The rear bearing for shaft D is provided by a member 79 which is disposed in a suitable opening 80 in the rear end wall 81 of the transmission casing 81ª, the rear end of the actuating shaft D being also supported by a piston for reciprocating the shaft and which will presenty be referred to in detail.

This actuating shaft D has a series of teeth forming a rack adapted to be brought into operative association with each of the screw gears, these racks being designated at 82, 83 and 84 for respectively operating the screw gears 77, 77ª, and 77ᵇ. The forward end of shaft D is further provided wtih a third speed actuating projection 85 adapted for engagement with the lever shoulder 59 for operating the third speed controlling device 34. It will be noted that the racks and projection 85 are longitudinally spaced along the shaft D and that they are also spaced circumferentially of the shaft whereby upon progression rotation of the shaft only one of the racks and the projection 85 will engage its associated screw gear or lever 55 at any time.

In Figs. 6 and 7 it will be noted that the shaft D is positioned so that the low speed rack 82 is in position for operating the low speed gear 77 and when the shaft D is moved forwardly or to the left as viewed in Fig. 6, the low speed screw 70 will be rotated to cause the aforesaid braking operation of the low speed controlling device 32 for establishing the low speed drive through the transmission. It will furthermore be noted that with the low speed rack 82 in the position illustrated, the remaining racks 73, 84 as well as projection 85 are free from engagement with their respective associated gears 77ª, 77ᵇ, and the lever 55. From Figs. 6 and 7 it will be noted that the shaft D has a space longitudinally and circumferentially between the second speed rack 84 and the direct drive projection 85, this space being designated as the neutral space "N" so that when the shaft is positioned with this space facing the screw gears, each of the racks as well as projection 85 will be free from contact with their associated screw gears and lever 55, and the transmission will be in neutral at which time the various braking devices 32, 33, 34 and 35 are released.

In order to selectively rotate the rack D for selectively engaging the racks and projection 85 thereof with the respective screw gears and lever 55, and also for axially operating the shaft in the various positions of selective adjustment, the following mechanism is provided.

Rearwardly adjacent the reverse rack 83, the shaft D is provided with a circular rack or gear 86 meshing wth a segmental rack 87 rotatably fixed with a shaft 88, best shown in Fig. 7, this shaft being rotatably journaled by a bearing 89 carried by the transmission side cover 90. The shaft 88 has fixed thereto, outwardly of the transmission cover, a lever 91 connected at 92 (see Fig. 1) to a Bowden wire operating mechanism 93.

The Bowden wire operating mechanism 93 extends forwardly for pivotal connection with a ball end 94 of a lever assembly 95 secured to a tubular shaft 96 as shown in Figs. 5 and 5A. The forward end of the Bowden mechanism has a guide 97, provided by the bracket 98 rigidly secured to the outer stationary tubular housing 99 comprising the steering post, as best shown in Fig. 1. A yielding connection is preferably provided at some convenient point between the manual selector element, which will be shortly described, and the segmental rack 87 for rotatably adjusting the shaft D. We have illustrated this yielding connection in Fig. 5A intermediate the lever ball end 94 and the forward end of the Bowden wire mechanism 93. The wire 93 is anchored at its forward end to a housing 100 provided with preloaded oppositely acting springs 101 and 102 which respectively act against the ball seats 103 and 104. The springs 101 and 102 have sufficient rigidity so that normally they provide a rigid connection between lever 95 and Bowden wire 93. However, if for any reason the manually operated adjusting mechanism for the shaft D should bind at any point, the mechanism will be protected during any manual adjustment of lever 95 under such conditions by reason of the ability of springs 101 and 102 to yield. This yielding connection is therefore in the nature of a safety device for the manually controlled selector operating mechanism. The hollow operating shaft 96 extends within the housing 99 and is suitably rotatably journaled therein.

Rotatable within the hollow shaft 96 is the hollow steering shaft 107 operably connected at its upper end to a steering wheel 108 and adapted for operable connection at its lower end to the usual steering mechanism for the front ground wheels of the motor vehicle (not shown). The hollow operating shaft 96 extends upwardly to the point preferably just below the steering wheel 108 to the manually controlled device generally designated at E for selectively controlling or manipulating the transmission speed ratios as will be presently more apparent.

Returning now to Fig. 6, the selector rack shaft D has its rear end adjacent the circular rack 86 provided with a groove 109 adapted to receive the flange 110 of the fluid pressure operating piston assembly 111 adapted for reciprocable movement in the cylinder 112 which is a part of a casting 113 best illustrated in Figs. 8 and 9 as attached at 114 to the rear wall of the transmission. The piston 111 provides the actuating member of the power operating means G for moving shaft D under power to engage the various brake bands and the direct speed clutch 34.

For yieldingly urging the rack shaft D to the right or rearwardly to release the speed ratio controlling devices, we have provided prime mover means F preferably in the form of a compression coil spring surrounding the rear end portion of shaft D between the fixed abutment provided for the bearing member 79 and acting on piston 111. In Fig. 6 it will be noted that the bearing member 79 is conveniently held in position by clamping the same between the rear casing wall 81 of the transmission and the casting assembly 113.

The piston 111 has a flexible sealing cup 115 adapted to seal the piston against escape of the fluid forwardly of the cylinder 112, the cup 115 bearing against the walls of the cylinder under the action of the fluid pressure introduced to the pressure chamber 116. The sealing cup is held in place by the rearwardly extending threaded reduced fastener or nut 118. Fluid, such as oil under pressure, is introduced to the pressure chamber 116 as best shown in Fig. 9, through a passage 119 leading to the valve controlled chamber or cylinder 120 which slidably receives the fluid pressure supply controlling valve 121.

The cylinder 120 is supplied with oil under pressure through a passage 122 which receives the oil by a conduit 123 formed in the transmission casing casting. The conduit 123, as best shown in Fig. 1, leads to the delivery side of a swash-plate type pump H driven from its location in the oil storing sump or reservoir 124 of the transmission casing by reason of the shaft 125 provided at its forward end by a driving gear 126. This gear meshes with an idler gear 127 which in turn meshes with the driving pinion 128 (see Fig. 6) carried on the rear end of the driving sleeve 29 which, as aforesaid, is fixed to the fluid impeller 21.

A valve guide porting member 129 is pressed into the cylinder 120 so as to be fixed therewith, this porting member having annular conduits 130 and 131, respectively, communicating with the passages 122 and 119. The annular passages 130 and 131 are also respectively provided with the inwardly extending ports 132 and 133 adapted for control by the valve 121. This valve has a sliding fit within the cylindrical bore 134 of the porting member 129 and extending axially through the valve with sufficient clearance to prevent binding thereof, is a valve operating rod 135 preferably of brass or other non-magnetic material. The rod 135 extends forwardly of valve 121 and is provided with a stop 136 adapted to limit forward movement of valve 121 under the influence of a spring 137 which operates between a valve spring abutment 138 and a rear fixed abutment 139, the latter having associated therewith the fluid pressure sealing washers 140 acting against the threaded stem 141 of the electrical solenoid 142.

The rear end of valve operating rod 135 is connected at 143 with the armature 144 of solenoid 142, the armature being adapted for reciprocation in the solenoid cylinder 145 having the rear abutment 146. Any fluid which may leak rearwardly beyond the valve 121 is adapted to drain downwardly from the portion of casting 113 which encloses the valve operating spring 137 by reason of the drain conduit 147, this conduit then extending forwardly to the main body of the transmission where the oil is permitted to drain back to the reservoir 124. A further conduit 148 is adapted to return the oil from operating cylinder 116 back to the reservoir, this conduit 148 opening rearwardly to the forward end of valve 121.

The valve 121 has the reduced valving portion 149 adapted to place the conduits 122 and 119 in communication when the valve is in its forward position under the influence of spring 137. In the drawings, the parts are shown in their positions for operating the low speed controlling device 32, the valve 121 being positioned forwardly so that the fluid pressure is just being delivered from the supply conduit 122 to the conduit 119 and the pressure chamber 116 of the cylinder 112. When the valve 121 moves rearwardly under the influence of solenoid 142, as will be presently more apparent, the spring 137 will be compressed and the reduced portion 149 will no longer provide communication between conduits 122 and 119 to supply fluid pressure from the pump H to operate the piston 111 and selector rack shaft D forwardly for actuating one of the speed ratio controlling devices 32, 33, 34 or 35, depending on the rotative selective adjustment of the selector rack shaft, as will be presently more apparent.

The function and operation of the manually controlled selector mechanism E in relation to the selector rack shaft D will now be further described.

Secured to the upper end of the hollow operating shaft 96, as best seen in Fig. 4, is an annular collar 150 having an integral laterally extending projection 151 providing an abutment for a spring 152 which has its lower end yieldingly acting against an intermediate portion of a manually operated selector element or lever 153. It will be noted that the extension 151 projects through an arcuate opening 154 of the fixed housing 99 to accommodate oscillating adjustment of the extension 151.

The inner end of selector lever 153 is pivotally mounted at 155 to an intermediate portion of the collar extension 151 so that the selector lever may have vertical movement on pivots 155 relative to the extension 151 but when lever 153 is moved around the axis of the steering post housing 99, the collar 150 together with its extension 151 and the shaft 96 will be rotatively moved as a unit.

Fixed on the upper end of the housing 99 is a housing 156 preferably in the shape of a sector. The outer end of this housing has a downwardly extending flange 157 provided with an arcuate opening 158 through which the lever 153 extends for arcuate adjustment. The outer end of the selector lever is provided with a knob or handle 159 adapted for convenient grasp by the hand of the motor vehicle driver.

The outer curving edge of housing 156 is preferably formed with a number of legends characterizing the various positions of manual adjustment of selector lever 153 depending on the number of stations of adjustment for this lever. In the particular embodiment illustrated, the selector lever 153 is adapted to have five positions of adjustment 160, 161, 162, 163 and 164 bearing the legends indicated in Fig. 3 designating the lever positions corresponding to first, second, third, neutral and reverse conditions of control for the transmission.

The flange 157 of housing 156 carries an arcuately arranged switch mechanism below the selector lever 153, this mechanism being best illustrated in the wiring diagram of Fig. 12. This switch comprises an arcuate floor 165 provided with a series of grooves or notches 166, 167, 168, 169 and 170 corresponding respectively to the positions of selector lever 153 when adjusted to the stations 160 to 164, inclusive. The upper sides of the aforesaid notches are preferably chamfered or beveled, as shown in Fig. 12, and the portion of selector lever 153 engageable with these notches is likewise beveled as indicated at 171.

When the operator desires to select any condition of control of the transmission, he swings the selector lever 153 into the desired position, the spring 152 yieldingly urging the selector lever downwardly into engagement with one of the notches of the switch member 165.

Referring now to the wiring diagram of Fig. 12, a plurality of switches or contacts 172 for each of the notches of the switch member 165 are adapted for operation by a stem 173 slidable in an opening 174 communicating with each of the switch notches. When the selector arm is located in any of the switch notches, one of the stems 173 associated with such notch is engaged by the selector lever and is pushed downwardly by the spring 152 to break the current through the wire 175 which connects all the switches 172 in series. Each switch 172 has a spring 176 associated therewith for restoring the switch to its contacting position and raising its stem 173 as soon as the selector lever is moved out of one of the notches. The wire 175 connects with one terminal of a storage battery 177, the other end of the wire 175 being connected to the windings 178 of the solenoid armature 144 aforesaid, which is grounded at the other terminal of the battery 177.

The manually controlled selector operating mechanism is practically instantaneous in its response to selective adjustment of the lever 153 and the different selections may be made as rapidly as desired. In the general operation of the selector mechanism E for changing the transmission speed ratio, the operator moves the selector lever 153 from one of the station notches in the switch member 165. Just as soon as the selector lever is moved from one of the notches, the switch 172 associated with such notch will be closed, thereby inducing an electrical circuit through the solenoid windings 178 for causing the solenoid armature 144 to move rearwardly against the abutment 146. This rearward movement of the solenoid armature will adjust the valve 121 rearwardly to place the fluid pressure chamber 116 of cylinder 112 in communication with the reservoir discharge conduit 148 whereupon the spring F will move the shaft D rearwardly to release any of the controlling devices 32 to 35 which might have been in operation. This entire phase of the operation takes place very quickly during the initial part of adjustment of the selector lever out of one of the notches of the switch member 165. The selector lever 153 may then be moved into any other station of control and dropped into the corresponding notch for such position.

When the selector lever is so released it will be apparent that one of the switches 172 corresponding to such newly selected position will be opened, thereby interrupting the electrical circuit through the wire 175 to the solenoid windings 178. At such time the spring 137 will immediately act to move the valve 121 and the armature 144 forwardly to establish communication between the fluid pressure supply conduit 122 and the pressure chamber 116. This will immediately cause a forward movement induced by the fluid pressure on the shaft D for operating one of the selector controlling devices which might have been selected for the new position or else for operating the shaft D without causing any movement of any of the speed ratio controlling devices in the event that neutral was selected.

Returning now to the aforesaid cycle of operation and to the point where the selector lever 153 was described as having been moved out of one of the notches preparatory to movement thereof into a newly selected notch, just as soon as the solenoid armature 144 moves rearwardly to operate the valve 121 to vent the pressure chamber 116, it will be apparent that the fluid pressure load is removed from the shaft D which is now in its rearward position so that arcuate movement of the selector lever 153 will operate through the hollow steering post shaft 107, Bowden wire mechanism 112, and sector 87 to rotatably adjust the shaft D into a new position for actuation of one of the speed ratio controlling devices. The mechanism operates almost instantaneously so that there is practically no resistance to immediate arcuate adjustment of the selector lever 153 from a position in one of the notches although any binding tendency experienced at the shaft D during the initial or other tendency to move the shaft will be taken up yieldingly through the Bowden wire connection shown in Fig. 5A.

With reference now to the details of the pump H and our pressure regulating means, the pump assembly includes a casing structure 179 fixed to the transmission structure as illustrated in Figs. 1 and 11. The casing 179 receives the pump drive shaft 125 which is suitably journalled at 180 and 181 by the casing.

As illustrated the gear 126 on the shaft 125 is in constant mesh with the idler gear 127 which in turn is drivingly connected with the fluid-impeller-associated driving pinion 128. A ported cylindrical member 182 is suitably fixed to the casing 179, the member 182 having inlet and outlet passages 183 and 184 respectively for the fluid, such as oil, admitted to the pump H and delivered therefrom under pressure. The inlet 183 is in suitable communication with the fluid in the reservoir 124.

Tightly pressed into a cylindrical opening 185 of the ported member 182 is a cylindrical port seat body or ring 186 journalling the adjacent end of the shaft 125, this body having inlet and outlet passages 187 and 188 communicating radially at one end with the passages 183 and 184 respectively. The other ends of the passages 187 and 188 form the well known circumferentially spaced arcuate inlet and outlet ports respectively for communication with the inlet and outlet ports of the pumping cylinders as will presently be apparent.

A pump rotor 189 is drivingly connected to the shaft 125 and carries a plurality of circumferentially spaced cylinders 190 opening inwardly toward a wabble or swash plate 191, a cylinder head portion 192 of the rotor having a port 193 for each cylinder.

A piston 194 is adapted to reciprocate within each cylinder 190 and is urged rearwardly by a spring 195 into contact with the swash plate 191. The rearwardly extending rounded end of each piston yieldingly engages an outer ring 196 of the swash plate. This ring is supported by a bearing 197 carried by a swinging arm 198 pivotally supported at 199 from the casing 179.

The swash plate 191 carries a yoke extension 200 which is adapted to be controlled by multiple pressure pistons 201, 202 and 203 in its swinging movement about the support 199 for levelling off the plate 191 and minimizing or eliminating reciprocation of the pistons 194. A plurality of parallel cylinders 204, 205 and 206 are provided by the casing 179 to accommodate the pistons 201, 202 and 203, respectively. Each of the pistons 201 to 203 carries a stem portion 207 suitably fixed to a yoked end member 208 by a pin 209. Shoulders 210 of the member 208 (best shown in Fig. 15) are positioned adjacent to the arms of the extension 200.

An end plate 211 is fixed by fasteners 212 to the casing 179 to close the rearward ends of the cylinders 204 to 206 and thus provide pressure chambers 213. The pistons 201, 202 and 203 are selectively acted upon by fluid under pressure through pressure conduits 214, 215 and 216 respectively, as will hereinafter be more apparent.

A cylindrical valve sleeve 217 is preferably carried by the casing 81ª and receives the conduits 214 to 216. Within the sleeve 217 a valve 218 is adapted to reciprocate in response to manipulation of the selector arm 153. Thus a rack extension 219 of the valve 218 receives vertical movement in response to rotation of a pinion 220 carried by the rack D.

The relation of the rack pinion 220 to the valve 218 is such that when the selector arm 153 is in its illustrated first speed position the valve places a pressure conduit 221 of the sleeve 217 in communication with the conduits 214 and 215. When the selector lever 153 is adjacent its second and third speed stations 161 and 162 respectively the valve 218 effects a communication between the conduit 221 and the conduits 214, 215 and 216. Upon swinging the arm 153 to its reverse station 164 the valve 218 opens the conduit 221 to conduit 214. Suitable bleeds 222 and 223 are provided in the sleeve 217 to return the escaping fluid to the reservoir 124.

To provide a suitable fluid pressure control for the conduit 221 to assist in making speed ratio selections with the selector arm 153, a valve 224 is adapted to progressively close the conduit 221 and place it in communication with the reservoir 124. The conduit 221 is received by a cylindrical valve casing 225 fixed to the casing of the fluid flywheel B. The valve 224 is adapted to move longitudinally within the casing 225 in response to the actuation of a suitable remote control by the vehicle operator. To this end, a link member 227 (best shown in Figs. 1 and 16) extends through a closely fitting end cap 228 to be fixed to the valve 224 and has an articulated connection at 229 on the shorter arm of a pedal 230 pivotally supported at 231 on the casing of the fluid flywheel B.

A fluid pressure conduit 232 is received adjacent to the conduit 221 by the valve casing 225, and a reduced valve portion 233 of the valve 224 is adapted to gradually close the conduits 221 and 232. Upon additional rearwardly movement of the valve 224, in response to further travel of the pedal 230 to the vehicle toe-boards 234, the conduits 221 and 232 will be opened to a pressure relief conduit 234 in the valve casing 225 communicating with the reservoir 124. The fluid pressure conduit 232 is in constant communication with the pump through the pressure delivery conduit 123.

As the shaft 125 drives the rotor 189, with the plate 191 in its Fig. 11 position for maximum stroke of the pistons 194, approximately half the pistons 194 are moving inwardly drawing in oil through their inlet port and ports 193 associated therewith, while the remaining pistons are discharging oil under pressure through their associated ports 193 and outlet port for conveyance through the conduit 123 in the well known manner.

When the pump H is initially operated, the pressure of the fluid delivered through the conduit 123 also communicates through the conduit 232 and with the one or more of the pressure conduits 214 to 216 providing the pedal 230 is in its illustrated position. It will be apparent from the disposition of the pistons 201, 202 and 203 relative to the wobble plate structure that the pump will deliver a greater pressure in response to action of the pistons 201 and 202 than will be delivered in response to action of the pistons 201, 202 and 203 thereon, and that a still further increase in pressure will result from the piston 201 acting singly. Thus, the pump is conditioned in response to manipulation of the selector to deliver a pressure which will satisfactorily and efficiently operate the selected speed ratio gear train of the transmission.

Referring to the modified embodiment of the invention illustrated in Figs. 17 to 20, the pump pressure regulating means is illustrated with a pressure system for a power transmitting device of the same general character as that of the earlier described embodiment except that the pressure medium is selectively admitted to individual pressure cylinders for actuating the operating means for each speed ratio controlling device. Parts of similar function but different construction have been indicated by primed reference characters.

The illustrated vehicle drive includes the prime mover or engine A, the fluid coupling clutch B' driven from the engine, and the change speed transmission C' driven from the clutch B'. During operation of the transmission C' the drive passes therefrom through the power take-off shaft 20'.

The change speed transmission C' is of the epicyclic or planetary type and includes the transmission speed ratio controlling devices 32', 33', 34' and 35', these devices being respectively adapted to actuate the transmission in its first speed ratio or low gear, second speed ratio or intermediate gear, third speed ratio or direct drive, and reverse drive. The aforesaid devices are adapted to act on transmission elements associated therewith and usually embodied in the form of a rotary drum 37', which is illustrated in Fig. 18 in association with the transmission controlling device 32' for the first speed ratio. Inasmuch as the form and arrangement of these planetary gear trains are well known in the art, the details thereof are omitted from this disclosure.

The speed ratio controlling devices are for the most part similar in construction and operation and the following description of the details of the controlling device 32' illustrated in Fig. 18 is typical of the other devices. In Fig. 18 the drum 37' is normally rotated by the planetary gearing 41 associated therewith when the transmission is not in its first speed driving condition, and when rotation of the drum 37' is prevented by the braking mechanism associated therewith, then the drive through the transmission takes place for the first speed gear ratio according to well known practices for planetary gearings of the general type illustrated.

To brake the drum 37', the band 36' around the drum provides ends 235 and 236 normally separated by a spring 237. The band is provided with the brake lining 38' adapted to contact with the drum when the ends 235 and 236 are forced toward each other for contracting the band. The band 36' is anchored in any suitable manner (not illustrated) and a suitable brake actuating mechanism is provided for each of the bands such as the actuating mechanism illustrated in Fig. 18.

Associated with each of the speed ratio controlling devices is a cylinder, one of which is illustrated at 238 in Fig. 18 in association with the controlling device 32'. This cylinder receives a pair of oppositely disposed pistons 239 and 240 operably connected to actuate the respective band ends 235 and 236 by suitable links 241 pivotally supported at 242. The cylinder has a fluid pressure inlet 243 adapted to admit fluid under pressure to the space between the pistons 239 and 240 in order to actuate these pistons away from each other as shown in Fig. 18 in contracting the brake band to arrest rotation of the associated controlling drum 37'. Upon release of the fluid pressure the spring 237 will act to space the brake band 36' from the drum 37', pistons 239 and 240 being restored and the fluid pressure being displaced from the cylinder 238 by way of the opening 243.

In order to selectively control the supply of fluid under pressure to the actuating mechanism of the various speed ratio controlling devices provision has been made for a fluid pressure control and distributing system, this system including a control mechanism, generally designated by the letter J operable in conjunction with the pump H shown in Fig. 11. The pump H is housed in a transmission casing 244 for actuation by a vertical shaft 245 having a gear 246 meshing with a gear 247 drivingly connected with the driving sleeve 248 of the driving vane member 249 of the fluid coupling B'. Fluid is drawn by the pump H from the reservoir 124' through the passage 183' and discharged through the high pressure passage 184' leading to the control J.

The swash plate 191 is controlled by the pressure responsive pistons 201, 202 and 203, as set forth in connection with Fig. 11, pressure being supplied to these pistons from the control J for regulating the pressure of fluid delivered by the pump in response to manipulation of a selector mechanism generally designated by the letter M, as will be hereinafter set forth.

The control J includes a casing 250 having a pair of cylinders 251 and 252, arranged in parallel relationship, in which are disposed reciprocatory pistons 253 and 254 respectively. The piston 253 has a reduced portion 255 which cooperates with the cylinder 251 to form a chamber 256 to which fluid pressure from the pump outlet 184' is admitted by the inlet passage 257 in the cylinder 251. The cylinder 251 is provided with ports 258, 259 and 260, through which fluid from the chamber 256 to the respective conduits 261, 262, 263, the latter communicating fluid pressure to the pistons 201, 202 and 203, respectively, for actuating the swash plate 191. Fluid from the chamber 256 is adapted to be communicated to the cylinder 252 through ports 264, 265, 266 and 267 disposed opposite respective ports 268, 269, 270 and 271 found in the wall of the chamber 252, the latter ports being adapted to communicate fluid through respective conduits 272, 273, 274 and 275 to the operating mechanism aforesaid of the speed ratio controlling devices 35', 32', 33' and 34', respectively. The piston 254 has an annular groove 254ª adapted to selectively communicate fluid from the ports 264, 265, 266 and 267 to a respective port 268, 269, 270 and 271. The piston 254 has a reduced portion 254 cooperating with the cylinder 252 to form a chamber for receiving fluid returned from a cylinder 238, such fluid passing from the chamber through one of the ports 276, 276ª and 276ᵇ for return to the reservoir 124'.

The valves 253 and 254 have stems 277 and 278, respectively portions of which extend through the casing 250 and are connected by the member 279 for simultaneous reciprocation by the selector mechanism indicated at M.

The mechanism J therefore constitutes a means by which fluid pressure is selectively distributed to the pistons 201, 202, and 203 for controlling the pressure of fluid delivered by the pump H in response to the selective operation of one of the speed ratio controlling devices of the transmission C. Operation of the mechanism J is controlled by the selector mechanism indicated at M.

The mechanism M is mounted upon the conventional steering column 280 immediately adjacent the steering wheel 281. A segmental bracket 282 is suitably secured to the column 280 and is provided with a plurality of arcuately spaced notches 283, 284, 285, 286, and 287 for receiving an arcuately movable lever 288 swingably mounted at 289. A Bowden wire 290 operatively connects the lever 288 with the member 279 for simultaneous reciprocation of the valves 253 and 254 for controlling the pump pressure delivery and selectively operating the speed ratio controlling devices of the transmission C' in the manner hereinafter set forth.

Positioning of the lever 288 in notch 283 places the transmission in neutral condition so that power is not transmitted therethrough, while placing the lever in notches 284, 285, 286 and 287 effects operation of the speed control devices 35', 32', 33' and 34' respectively, in the well known manner. As illustrated, the lever 288 is engaged in notch 285 for operation of the first speed ratio controlling device 32' for low speed operation, such device requiring a higher degree of fluid pressure than the second and third speed devices 33' and 34' respectively. Manipulation of the lever to the position indicated reciprocates the piston 253 so that the chamber 256 communicates with the ports 258 and 259 and fluid pressure is supplied through conduits 261 and 262 to the piston 201 and 202, respectively, for effecting a fluid pressure delivery of the pump H to provide suitable operation of the device 32'. The piston 254 is simultaneously moved to the position indicated so that the annular groove 254a registers with the ports 265 and 269 and fluid pressure is communicated to the cylinder 238 through the conduit 273 for operating the pistons 239 and 240, thus causing the band 36' to arrest rotation of the drum 37' of the device 32'. Any fluid which may have been previously supplied to the operating mechanism for the devices 33' and 34' with return through the ports 270 and 271 respectively, due to the action of the spring 237, and be evacuated from the cylinder 252 through the bleed 276 and communicated to the reservoir 124'. In the event the reverse speed ratio controlling device has been previously operated, fluid returning to the chamber 252 through the port 268 will be evacuated through the port 276ᵇ for communication to the reservoir 124'.

When the second and third speed ratio controlling devices 33' and 34' respectively are operated the valves 253 and 254 are simultaneously moved so that each of the ports 258, 259 and 260 are in communication with the chamber 256 and fluid is communicated to each of the pistons 201, 202 and 203 and the swash plate 191 is moved upwardly to effect a reduction of fluid pressure delivery of the pump, it being understood that these speed ratio controlling devices do not require as great a fluid pressure as that required for the satisfactory operation of the first speed ratio controlling device. In the event that the second speed ratio controlling device is selected, the groove 254a of piston 254 establishes communication between the ports 266 and 270, and fluid returning to the cylinder 252 from the cylinder 238 of the first speed ratio controlling device 32' through the port 269 is evacuated through the port 276ᵇ to the fluid reservoir 124'.

In the event the third speed ratio controlling device 34' is selected, the groove 254a establishes communication between the ports 267 and 271 and fluid returning to the cylinder 252 from either of the ports 270, 269 or 268 is evacuated through the port 276ᵇ.

When the reverse speed ratio controlling device 35' is selectively operated, the valves 253 and 254 are again simultaneously moved by manipulation of lever 288 to the notch 284, the valve 253 closing ports 259 and 260 against communication with the chamber 256, port 258 being open and pressure fluid communicated to the piston 201 only. It will be apparent that a greater fluid pressure acting through the piston 201 will be required to level off the swash plate 191 that will be required for a similar action by the pistons 201 and 202 for first speed operation and 201, 202 and 203 for second and third speed operation. When the lever 288 is positioned, as aforesaid, the groove 254a of valve 254 registers with ports 267 and 271 for communicating fluid through the conduit 272 to the cylinder 238 of the control device 35' selected. Fluid returning from the cylinder 238 of the previously operated speed ratio device is evacuated from the cylinder 252 through the ports 276a or 276.

When the lever is positioned in the notch 283 and the transmission is in neutral position by reason of the fact that the groove 254a no longer registers with either of the ports 268, 269, 270 or 271 and fluid is returned to the reservoir 124'.

Various modifications and changes will be apparent from the teachings of our invention, as defined in the appended claims, and it is not our intention to limit our invention to the particular details of construction and mode of operation shown and described for illustrative purposes.

What we claim is:

1. In a motor vehicle transmission having a plurality of speed ratio controlling devices, pressure fluid actuated means for selectively operating said devices, manually operable means for controlling the selective operation of said pressure fluid actuated means, means including a pump for supplying pressure fluid to said actuated means, means including a swingingly mounted wabble plate structure for controlling the pressure of fluid delivered by said pump, a plurality of pressure fluid actuated pistons for controlling movement of said wabble plate structure in one direction only, valve mechanism for controlling the pressure fluid actuation of said pistons, and means responsive to the operation of said manually operable means for actuating said valve mechanism.

2. In a motor vehicle transmission having a plurality of speed ratio controlling devices, pressure fluid actuated means for selectively operating said devices, manually operable means for controlling the selective operation of said pressure fluid actuated means, means including a pump for supplying pressure fluid to said actuated means, means including a swingingly mounted wabble plate structure for controlling the pressure of fluid delivered by said pump, a plurality of pressure fluid actuated pistons for controlling movement of said wabble plate structure in one direction only, and means responsive to the selective operation of one of said devices for causing the selective operation of said pistons.

3. In a motor vehicle transmission having a plurality of speed ratio controlling devices pressure fluid actuated means for selectively operating said devices, manually operable means for controlling the selective operation of said pressure fluid actuated means, means including a pump for supplying pressure fluid to said actuated means, said pump comprising a plurality of reciprocating pistons, a wabble plate structure controlling movement of said pistons, a plurality of selectively operable pressure fluid actuated pistons acting on said structure in opposition to said pump pistons, and valve means operable in response to the operation of said manually operable means for controlling the selective operation of said fluid actuated pistons.

4. In a motor vehicle transmission having a plurality of speed ratio controlling devices, pressure fluid actuated means for selectively operating said devices, manually operable means for controlling the selective operation of said pressure fluid actuated means, means including a pump for supplying pressure fluid to said actuated means, said pump comprising a plurality of reciprocating pistons, a wabble plate structure controlling movement of said pistons, a plurality of selectively operable pressure fluid actuated elements acting on said structure in opposition to said pump pistons, said elements being so disposed with respect to said wabble plate structure that selective actuation thereof will effect a variation in the control of said pump pistons by said wabble plate structure, and valve means for selectively controlling the actuation of said elements.

5. In a motor vehicle transmission having a plurality of speed ratio controlling devices, pressure fluid actuated means including a common operating member for selectively operating said devices, manually operable means for controlling the selective operation of said operating member, means including a pump for supplying pressure fluid to said member, said pump comprising a plurality of reciprocating pistons, a wabble plate structure controlling movement of said pistons, a plurality of selectively operable pressure fluid actuated elements acting on said structure in opposition to said pump pistons, said elements being so disposed with respect to said structure that selective actuation thereof will effect a variation in the control of said pump pistons by said structure, and valve means operable by said member for selectively controlling the actuation of said elements.

6. In a motor vehicle transmission having a plurality of speed ratio controlling devices, pressure fluid actuated means including a common operating member for selectively operating said devices, manually operable means for controlling the selective operation of said operating member, means including a pump for supplying pressure fluid to said member, said pump comprising a plurality of reciprocating pistons, a wabble plate structure controlling movement of said pistons, a plurality of selectively operable pressure fluid actuated pistons acting on said structure in opposition to said pump pistons, and valve means operable by said member for controlling the selective operation of said fluid actuated pistons.

7. In a motor vehicle transmission having a plurality of speed ratio controlling devices, pressure fluid actuated means including a common operating member for selectively operating said devices, manually operable means for controlling the selective operation of said operating member, means including a pump for supplying pressure fluid to said member, said pump comprising a plurality of reciprocating pistons, a wabble plate structure controlling movement of said pistons, a plurality of selectively operable pressure fluid actuated pistons acting on said structure in opposition to said pump pistons, and valve means for selectively controlling the pressure fluid actuation of said pistons, said valve means being operable by said member for selectively varying the action of said fluid actuated pistons on said wabble plate structure in response to the selective operation of said member by said manually operable means.

8. In a motor vehicle transmission having a plurality of speed ratio controlling devices, pressure fluid actuated means for selectively operating said devices, valve means for controlling the selective operation of said pressure actuated means, a manually operable means for selectively operating said valve means, means including a pump for supplying pressure fluid to said actuated means, said pump comprising a plurality of reciprocating pistons, a wabble plate structure controlling movement of said pistons, a plurality of selectively operable pressure fluid actuated elements acting on said structure in opposition to said pump pistons, said elements being so disposed with respect to said structure that selective actuation thereof will effect a variation in the control of said pump pistons by said structure, and valve means for selectively actuating said elements, said last named valve means being operable by said manually operable means in timed relation to the selective operation thereby of said first mentioned valve means.

9. In a motor vehicle transmission having a plurality of speed ratio controlling devices, pressure fluid actuated means for selectively operating said devices, manually operable means for controlling the selective operation of said pressure fluid actuated means, means including a pump for supplying pressure fluid to said actuated means, said pump comprising a plurality of reciprocating pistons, a wabble plate structure controlling movement of said pistons, a plurality of selectively operable pressure fluid actuated pistons acting on said structure in opposition to said pump pistons, valve means operable by said manually operable means for selectively communicating pressure fluid to said devices, and a second valve means for selectively communicating pressure fluid to said fluid actuated pistons, said second valve means being operable by said manually operable means for varying the action of said fluid actuated pistons on said wabble plate structure in timed relation to the selective operation of one of said devices.

10. In a motor vehicle transmission having a plurality of speed ratio controlling devices, pressure fluid actuated means for operating said devices, manually operable means for controlling the selective operation of said pressure fluid actuated means, means including a pump supplying pressure fluid to said actuated means, a swingably mounted wabble plate structure for controlling the pressure of fluid delivered by said pump, a plurality of pressure fluid actuated pistons for controlling movement of said wabble plate structure in one direction only, valve means for selectively communicating pressure fluid to said devices, a second valve means for selectively communicating pressure fluid to said pistons, and means responsive to the operation of said manually operable means for actuating said first and second valve means in a predetermined timed relation.

11. In a motor vehicle transmission having a plurality of fluid pressure operated speed ratio controlling devices, means controlling selective operation of said devices, means including a pump for supplying a fluid under operating pressure for operation of said devices, means including a swingingly mounted wabble plate structure for controlling the pressure of fluid delivered by said pump, a plurality of pressure fluid actuated pistons for controlling movement of said wabble plate structure in one direction only, and valve means responsive to operation of said control means for controlling fluid pressure actuation of said pistons.

12. In a motor vehicle transmission having a plurality of fluid pressure operated speed ratio controlling devices, means controlling selective operation of said devices, means including a pump for supplying a fluid under operating pressure for operation of said devices, means including a swingingly mounted wabble plate structure for controlling the pressure of fluid delivered by said pump, a plurality of pressure fluid actuated elements for controlling movement of said wabble plate structure in one direction only, and means responsive to the selective operation of one of said devices for causing the selective operation of said elements.

13. In a motor vehicle transmission having a plurality of fluid pressure operated speed ratio controlling devices, means controlling selective operation of said devices, means including a pump for supplying a fluid under operating pressure for operation of said devices, said pump comprising a plurality of reciprocating pistons, a wabble plate structure controlling movement of said pistons, a plurality of selectively operable pressure fluid actuated pistons acting on said structure in opposition to said pump pistons, and valve means operable in response to the operation of said control means for controlling the selective operation of said fluid actuated pistons.

14. In a motor vehicle transmission having a plurality of fluid pressure operated speed ratio controlling devices, means controlling selective operation of said devices, means including a pump for supplying pressure fluid under operating pressure for operation of said devices, said pump comprising a plurality of reciprocating pistons, a wabble plate structure controlling movement of said pistons, a plurality of selectively operable pressure fluid actuated elements acting on said structure in opposition to said pump pistons, said elements being so disposed with respect to said wabble plate structure that selective actuation thereof will effect a variation in the control of said pump pistons by said wabble plate structure, and valve means for selectively controlling the actuation of said elements.

15. In a motor vehicle transmission having a plurality of fluid pressure operated speed ratio controlling devices, manually operable means operable to effect selective operation of said devices, means including a pump for supplying a fluid under operating pressure for operation of said devices, said pump comprising a plurality of reciprocating pistons, a wabble plate structure controlling movement of said pistons, a plurality of selectively operable pressure fluid actuated elements acting on said structure in opposition to said pump pistons, and valve means operable by said manually operable means for controlling the selective operation of said fluid actuated elements.

16. In a power transmitting mechanism including a plurality of fluid pressure operated speed ratio control devices, a pump for supplying a fluid under operating pressure for operation of said devices, a wabble plate movable to vary the fluid delivery output of said pump, a plurality of fluid pressure actuated elements operable to move said plate in one direction, valve means operable to effect distribution of pressure fluid to said devices, means operable to effect operation of said valve means, and means responsive to operation of the means to effect operation of said valve means for controlling operation of said fluid pressure actuated elements.

17. In a power transmitting mechanism including a plurality of fluid pressure operated speed ratio control devices, a pump for supplying a fluid under operating pressure for operation of said devices, a wabble plate movable to vary the fluid delivery output of said pump, a plurality of elements operable to move said plate in one direction, valve means operable to effect distribution of pressure fluid to said devices, means operable to effect operation of said valve means, and means responsive to operation of the means to effect operation of said valve means for effecting selective operation of said elements.

18. In a power transmitting mechanism including a plurality of fluid pressure operated speed ratio control devices, valve means operable to effect distribution of pressure fluid to said devices, control means operable to effect operation of said valve means, a variably operable pump for supplying a fluid under operating pressure for operation of said devices, means operable to vary the operation of said pump, said last named means including a plurality of elements operable by the pressure of fluid delivered by said pump, and valve means operable in response to operation of said control means for effecting selective operation of said elements.

19. In a power transmitting mechanism including a plurality of fluid pressure operated speed ratio control devices, valve means operable to effect distribution of pressure fluid to said devices, means operable to effect operation of said valve means, a variable operable pump for supplying a fluid under operating pressure for operation of said devices, means operable to vary the operation of said pump, said last named means including a fluid pressure actuated element, and valve means operable to effect operation of said element, said last mentioned valve means being operable in timed relationship to operation of the means operable to effect operation of said first mentioned valve means.

WILLIAM T. DUNN.
OTTO W. SCHOTZ.